United States Patent
Daoud

[19]

[11] Patent Number: 6,087,584
[45] Date of Patent: Jul. 11, 2000

[54] TUBULAR CABLE GROUNDING MECHANISM

[75] Inventor: Bassel Hage Daoud, Parsippany, N.J.

[73] Assignee: Lucent Technologies Inc., Murray Hill, N.J.

[21] Appl. No.: 09/107,492

[22] Filed: Jun. 30, 1998

[51] Int. Cl.$^7$ .................................................. H02G 3/18
[52] U.S. Cl. .......................... 174/50.59; 174/59; 439/99
[58] Field of Search .................... 174/78, 50.59, 174/51, 59, 48; 439/98, 99; 29/742, 745

[56] References Cited

U.S. PATENT DOCUMENTS

| | | | |
|---|---|---|---|
| 4,739,126 | 4/1988 | Gutter et al. | 174/65 SS |
| 4,917,615 | 4/1990 | Franks, Jr. | 439/98 |
| 5,288,946 | 2/1994 | Jackson et al. | 174/74 R |
| 5,691,506 | 11/1997 | Miyazaki et al. | 174/65 R |

*Primary Examiner*—Dean A. Reichard
*Assistant Examiner*—Dhiru R. Patel

[57] ABSTRACT

An electrical connector assembly simply, and securely, grounds a shielding layer of a telephone cable to a conductive, grounded electrical box housing a protector module. During assembly, an insulation layer is removed from an end of the telephone cable to expose a portion of the shielding layer. The exposed portion of the shielding layer is folded back onto an adjacent, remaining portion of the insulation layer. A first sleeve is inserted into the end of the telephone cable and resides beneath a portion of the shielding layer. A second sleeve, formed of an electrically conductive material, is physically and electrically attached to the electrical box. The end of the telephone cable, having the first sleeve inserted therein, is inserted into the second sleeve. At least one crimp is formed in the second sleeve, which causes an inner conductive surface of the second sleeve to contact the folded back, shielding layer of the telephone cable to thereby establish an electrical connection between the electrical box and the shielding layer.

25 Claims, 7 Drawing Sheets

TUBULAR CABLE GROUNDING MECHANISM

FIELD OF THE INVENTION

This invention relates to electrical connectors. More particularly, the present invention relates to a coupling mechanism for coupling a shielding layer of a multi-phone line cable to a conductive, grounded chassis of a protector module. The coupling mechanism simultaneously, physically attaches the multi-phone line cable to the protector module, grounds the shielding layer of the multi-phone line cable to the grounded chassis of the protector module, and provides strain relief to the coupling.

BACKGROUND OF THE INVENTION

A protector module is typically provided shortly after an incoming multi-line phone cable enters into an office or apartment building, having multiple independent phone lines. The incoming multi-line phone cable includes many independent pairs of telephone wires, such as fifty pairs. The purpose of the protector module is to protect each of the independent pairs of phone lines from a power surge, such as a surge induced by a nearby lightening strike.

To accomplish this purpose, the incoming multi-line phone cable is cut, or terminated, at the protector module. Each pair of phone lines is electrically connected to one of a plurality of electrical surge protectors of the protector module. The building's internal phone lines are collectively presented to the protector module as an outgoing multi-line phone cable. The outgoing multi-line phone cable is also terminated at the protector module and has its pairs of phone lines connected to the plurality of electrical surge protectors of the protector module.

In operation, the surge protectors of the protector module respond to any power surge on one or more of the incoming phone lines by diverting the surge to the grounded chassis of the protector module. By diverting surges to ground, the surge protectors prevent the surges from passing into the phone lines of the outgoing multi-line phone cable and possibly damaging telephone equipment located within the office or apartment building.

All of the pairs of telephone wires of the incoming multi-line phone cable are surrounded by a shielding layer, which in turn is surrounded by an insulation layer. It is important to ground the shielding layer of the incoming multi-line phone cable to the grounded chassis of the protector module. Likewise, all of the pairs of telephone wires of the outgoing multi-line phone cable are surrounded by a shielding layer, which in turn is surrounded by an insulation layer, and it is important to ground this shielding layer to the grounded chassis of the protector module. By so doing, a conductive path is formed for induced currents within the shielding layers, a uniform ground is established, and electrical noise within the phone lines is reduced.

Figure 1:
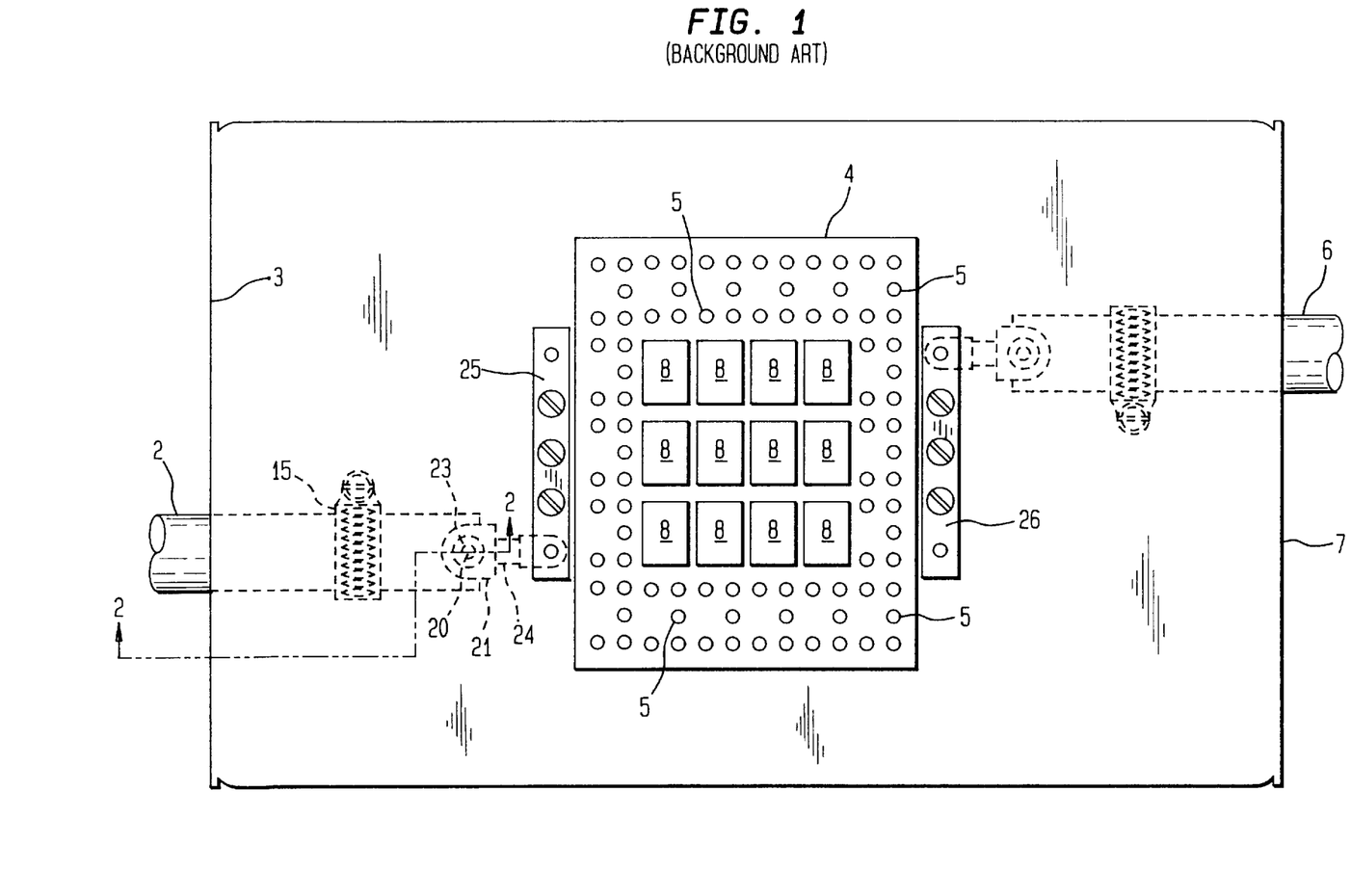
FIG. 1 is an overhead view of a protector module having an electrical connection between a shielding layer of a multi-line phone cable and a conductive terminal on the chassis of the protector module, in accordance with the background art.

FIG. 1 is an overhead view of a protector module 1, according to the background art. An incoming multi-line phone cable 2 enters the protector module 1 through an opening provided in a sidewall 3. The incoming multi-line phone cable 2 includes numerous individual phone lines 100 (illustrated in FIG. 8) which are wire wrapped to selected individual terminals beneath a bread board 4. Each of the individual terminals beneath the bread board 4 is electrically connected to a respective electrical socket 5 provided on an upper surface of the bread board 4.

As also illustrated in FIG. 1, an outgoing multi-line phone cable 6 enters the protector module 1 through an opening provided in an opposite sidewall 7. The outgoing multi-line phone cable 6 also includes numerous individual phone lines (illustrated in FIG. 8), which are wire wrapped to different individual terminals beneath the bread board 4.

A plurality of removable and replaceable, electrical surge protectors 8 have plug terminals, which are inserted into the sockets 5 on the upper surface of the bread board 4. The electrical surge protectors 8 electrically connect the individual phone lines of the incoming multi-line phone cable 2 to the individual phone lines of the outgoing multi-line phone cable 6. The electrical surge protectors 8 include components, such as gas filled vials, which can divert a power surge from the phone lines of the incoming multi-line phone cable 2 to ground. By this arrangement, the protector module 1 can protect phone equipment, located within the office or apartment building, attached to the individual phone lines of the outgoing multi-line phone cable 6.

Figure 2:
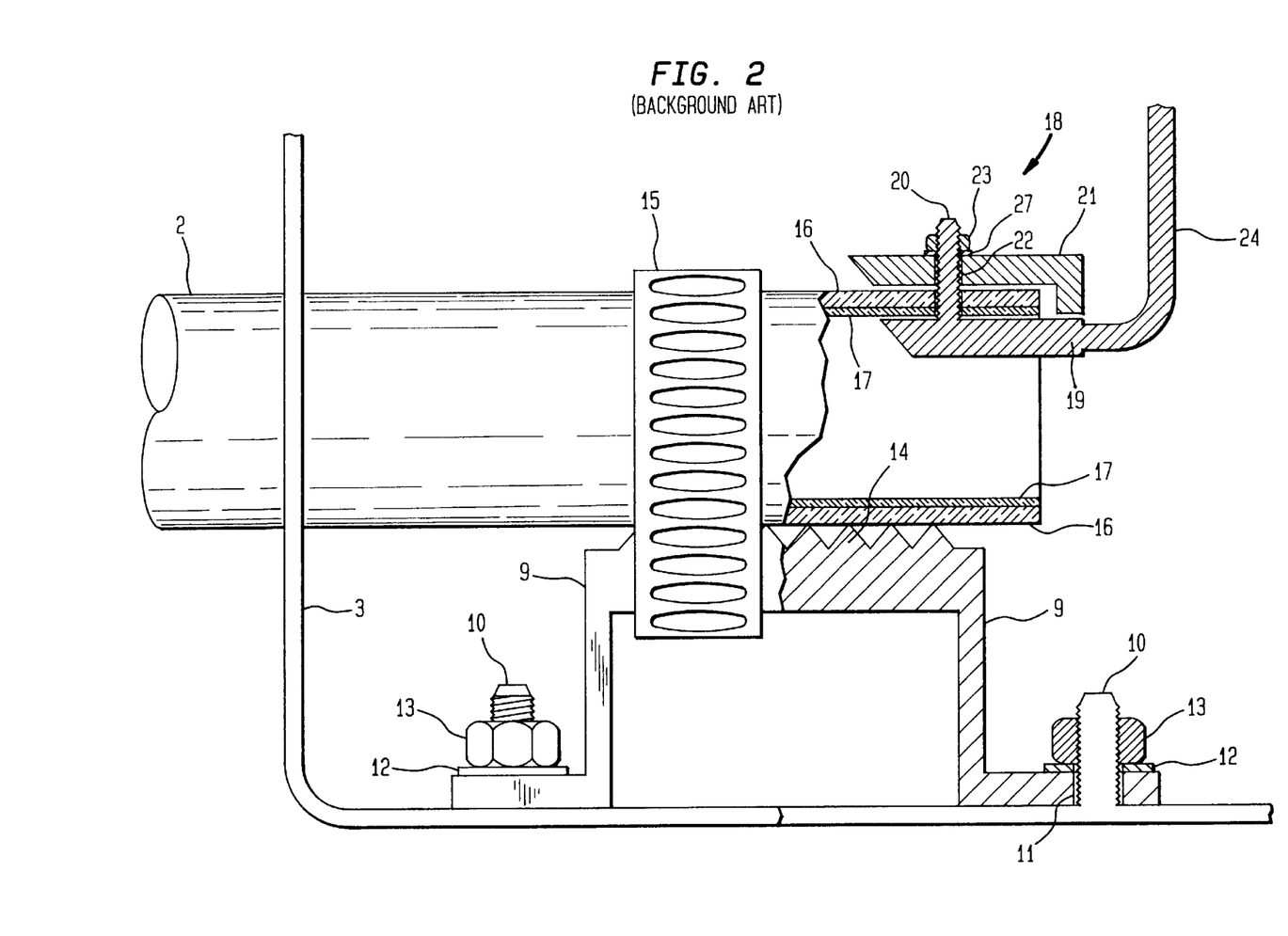
FIG. 2 is a cross sectional view taken along line 2—2 of FIG. 1.

FIG. 2 illustrates the physical connection between the incoming multi-line phone cable 2 and the protector module 1. The physical connection between the outgoing multi-line phone cable 6 and the protector module 1 is identical to the physical connection between the incoming multi-line phone cable 2 and the protector module 1. Therefore, the later physical connection will not be described in detail.

As shown in FIG. 2, a bracket 9 is installed to a bottom of the protector module 1 adjacent the sidewall 3. The bottom of the protector module 1 includes threaded studs 10, which are passed through holes 11 formed in the bracket 9. The bracket 9 is tightly secured to the bottom of the protector module 1 by engaging washers 12 and nuts 13 to the threaded studs 10.

An upper portion of the bracket 9 includes a plurality of ribs 14. The incoming multi-line phone cable 2 is placed upon the ribs 14, and secured to the bracket 9 by a standard hose clamp 15. The hose clamp 15 presses an insulation layer 16 of the incoming multi-line phone cable 2 tightly against the ribs 14 of the bracket 9. By this arrangement, the hose clamp 15 provides strain relief to the connection by preventing any tension on the wire wrap connections between the individual phone lines and the wire wrap terminals of the bread board 4.

Inside the insulation layer 16 is a shielding layer 17. The shielding layer 17 prevents electromagnetic fields adjacent to the incoming multi-line phone cable 2 from inducing currents with the individual phone lines, and thereby prevents undesirable electrical noise. It is important that the shielding layer 17 be electrically connected to a ground potential. In order to accomplish this grounding, a clamping device 18 is provided.

The clamping device 18 includes an electrically conductive, stationary jaw 19. The stationary jaw 19 has a threaded stud 20 integrally formed therewith. A short slit is cut through the insulation layer 16 and the shielding layer 17, wide enough to accommodate the threaded stud 20. Then, the stationary jaw 19 is inserted into an end of the incoming multi-line phone cable 2 so that the stationary jaw 19 contacts the shielding layer 17, while the threaded stud 20 passes along in the slit formed in the insulation layer 16 and the shielding layer 17.

A clamping jaw 21 has a through hole 22 formed therein. The threaded stud 20 is passed through the through hole 22, and then the clamping jaw 21 is placed adjacent to the insulation layer 16. A washer 27 and nut 23 are installed on the threaded stud 20 and the nut 23 is tightened. By this arrangement, the stationary jaw 19 can be securely, electrically connected to the shielding layer 17.

A ground strap 24 connects the stationary jaw 19 to a first grounding post 25 provided on a conductive, grounded chassis of the protector module 1, adjacent the bread board 4. The outgoing multi-line phone cable 6 has its shielding sleeve connected to a second grounding post 26 provided on the grounded chassis of the protector module 1, in a manner identical to that described above in conjunction with the incoming multi-line phone cable 2. Because the grounded chassis is conductive, the first grounding post 25 is electrically connected to the second grounding post 26, and thereby the shielding sleeves of the incoming and outgoing multi-line phone cables are electrically connected.

The above described method of grounding the shielding layers of the incoming and outgoing multi-line phone cables suffers several drawbacks. The pressure exerted by the hose clamp 15, against the insulation layer 16, translates into internal stresses on the phone lines within the incoming multi-line phone cable 2. The stresses can break a conductor within a particular phone line, resulting in a loss of phone service. The stresses can deform the conductor within a particular phone line, creating a resistance in the conductor, resulting in noise in the phone service. Also, the stresses can press the phone lines closer together, resulting in cross-talk between phone lines. Further disadvantages are that a service technician must remember, and spend time installing, the clamping device 18. The clamping device 18 takes up space within the protector module 1, and the ground strap 24 presents an obstacle within the protector module 1.

SUMMARY OF THE INVENTION

The electrical coupling mechanism of the present invention overcomes one or more of the disadvantages associated with the clamping device 18 of the background art. The electrical coupling mechanism of the present invention simultaneously, physically attaches a shielded electrical cable, such as a multi-line phone cable, to an electrical box, such as a protector module, grounds the shielding layer of the multi-line phone cable to the conductive chassis of the protector module, and provides strain relief to the coupling.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitative of the present invention, and wherein.

DETAILED DESCRIPTION

Figure 3:
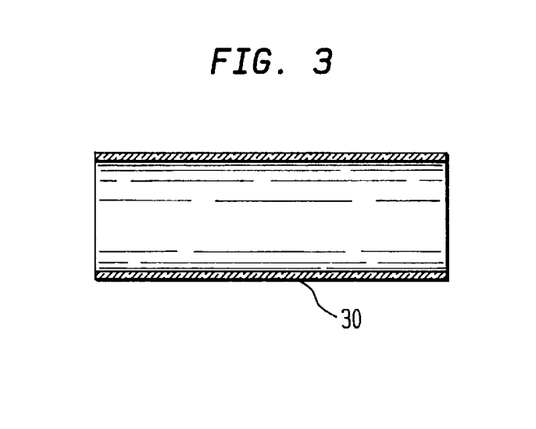
FIG. 3 is a cross sectional view of a first sleeve for insertion into an end of the multi-line phone cable, in accordance with first and second embodiments of the present invention.

FIG. 3 is a cross sectional view of a first sleeve 30 for use in the first and second embodiments of the electric coupling mechanism of the present invention. The first sleeve 30 is shaped as a cylinder having two open ends. The first sleeve 30 is approximately three and half inches long, and is formed of a rigid material. The first sleeve 30 is inserted into the cut end of the incoming multi-line phone cable 2, and an outer surface of the first sleeve 30 resides against an inner surface of the shielding layer 17. A plurality of phone lines 100 (see FIG. 8), such as fifty to one hundred phone lines, would pass through the cross section of the first sleeve 30 and extend up to the wire wrap terminals under the bread board 4.

Figure 4:
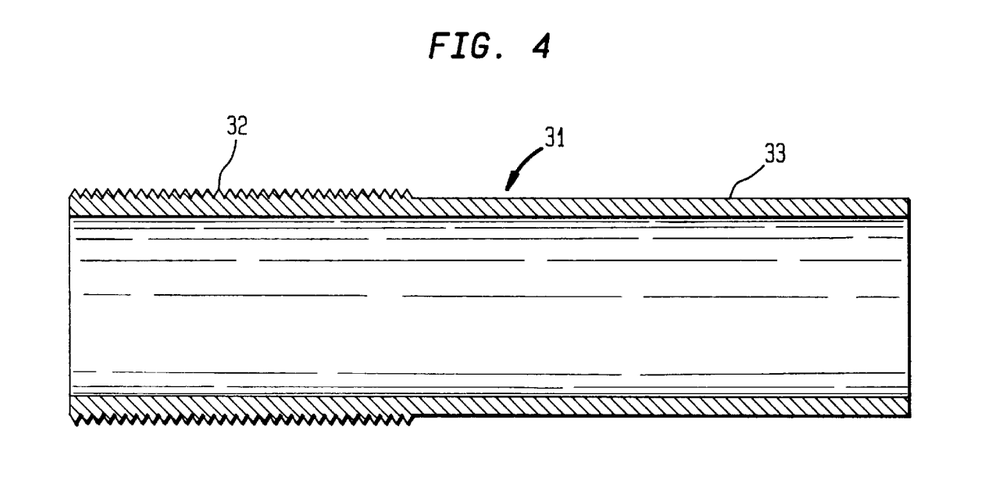
FIG. 4 is a cross sectional view of a second sleeve for attachment to the protector module, in accordance with the first embodiment of the present invention.

FIG. 4 illustrates a second sleeve 31 for use in the first embodiment of the electric coupling mechanism of the present invention. The second sleeve 31 is shaped as a cylinder having two open ends, and is formed of a conductive alloy or conductive metal, such as aluminum, gold, or copper. One end of the second sleeve 31 includes a threaded portion 32 on its outer surface. The other end of the second sleeve 31 has a smooth outer surface 33.

Figure 5:
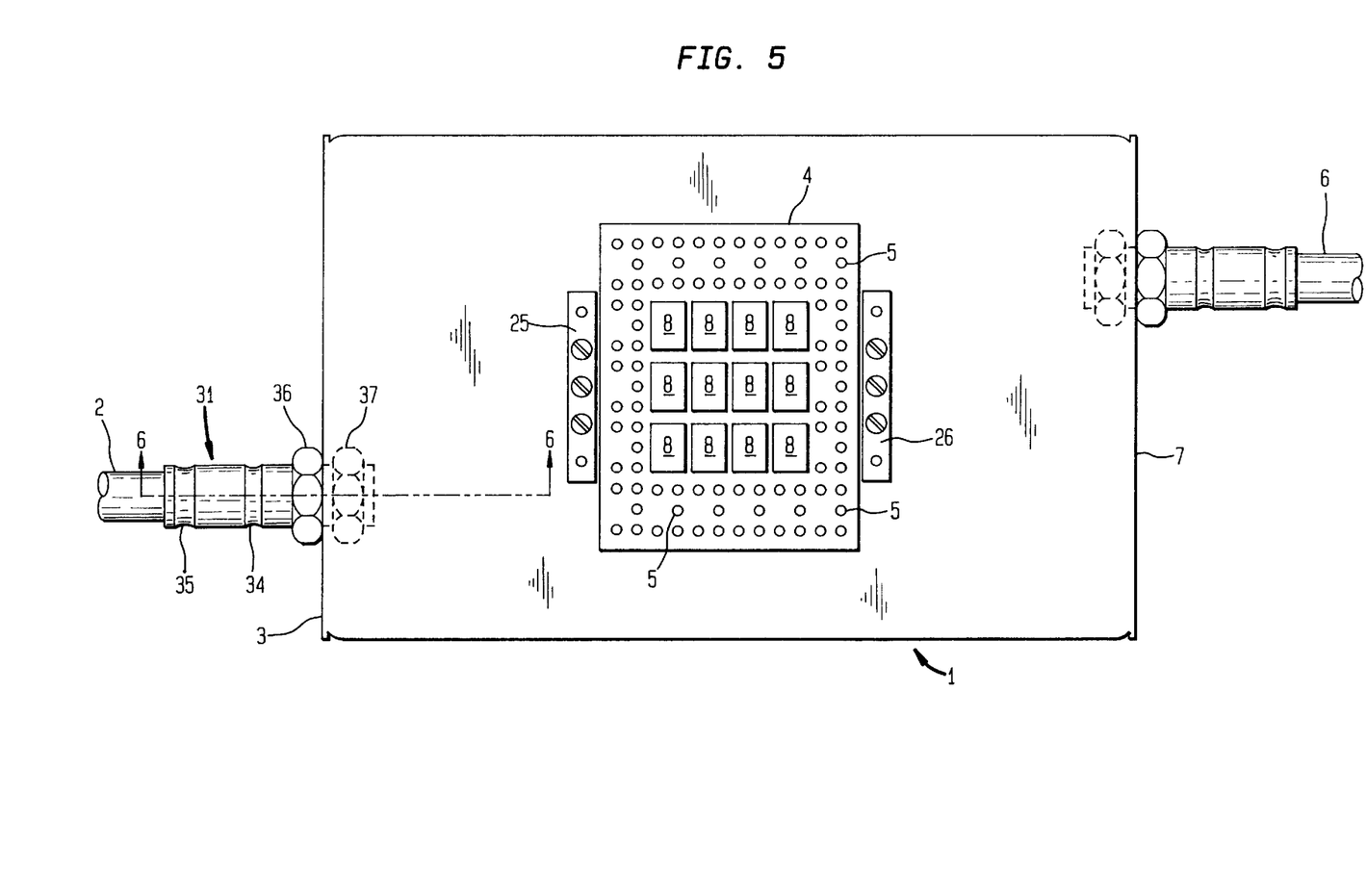
FIG. 5 is an overhead view of the protector module having an electrical connection between the shielding layer of the multi-line phone cable and a conductive chassis of the protector module, in accordance with the first embodiment of the present invention.
Figure 6:
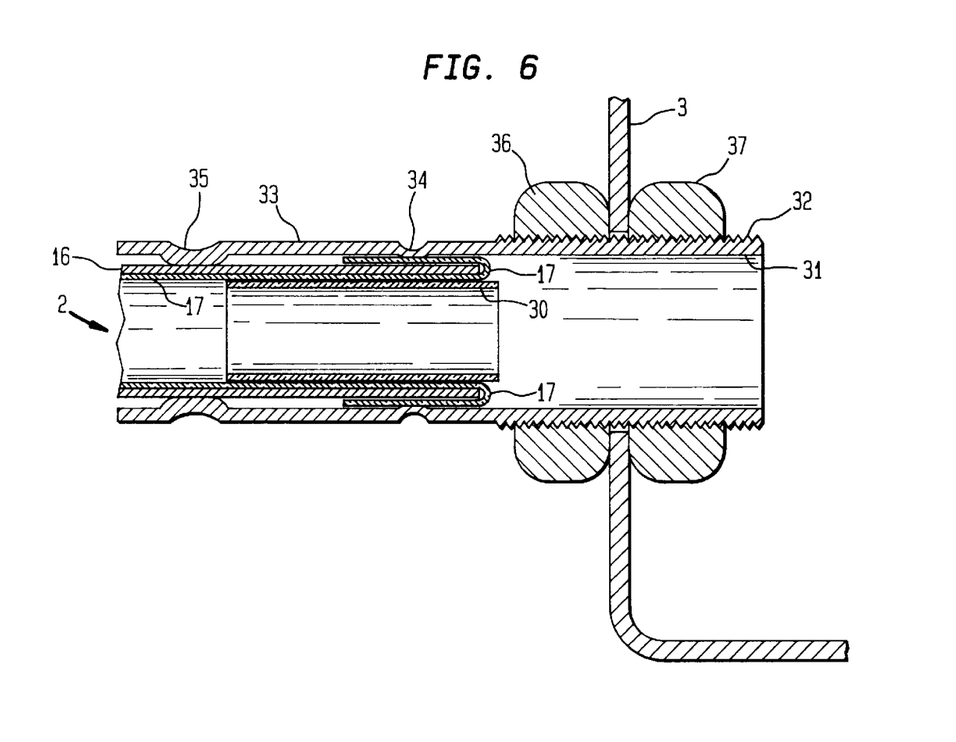
FIG. 6 is a cross sectional view taken along line 6—6 of FIG. 5.

Now, the construction of the first embodiment of the electric coupling mechanism will be described with reference to FIGS. 5 and 6. The insulation layer 16 is removed from an end of the incoming multi-line phone cable 2, thereby exposing the shielding layer 17. The exposed shielding layer 17 is folded back onto an adjacent, remaining portion of the insulation layer 16. The first sleeve 30 is inserted into the end of the incoming multi-line phone cable 2, so as to reside beneath the folded back portion of the shielding layer 17.

Next, the end of the incoming multi-line phone cable 2 is inserted into the second sleeve 31. A first crimp 34 is formed in the smooth outer surface 33 of the second sleeve 31. The first crimp 34 is located, so that it overlies the folded back portion of the shielding layer 17. The first crimp 34 causes an inner surface of the second sleeve 31 to contact the shielding layer 17, and to form good electrical contact therewith. The rigidity of the first sleeve 30 provides protection to the plurality of phone lines of the incoming multi-line phone cable 2. Therefore, the first crimp 34 will not translate into breakage, deformation, or displacement of the phone lines of the incoming multi-line phone cable 2.

A second crimp 35 may also be formed in the smooth outer surface 23 of the second sleeve 31. The second crimp 35 would be located, so that it overlies the insulation layer 16 of the incoming multi-line phone cable 2. The second crimp 35 would provide strain relief to the electrical connection formed by the first crimp 34.

The first and second crimps 34, 35 would be made by a special crimping tool, which encircles the second sleeve 31 and provides a uniform pressure to cause the second sleeve 31 to controllably collapse toward the incoming multi-line phone cable 2. Although FIG. 5 illustrates continuous first and second crimps 34, 35, it is envisioned that non-continuous crimps could be formed in the second sleeve 31, such as segmented crimps. Also, it is envisioned that the first crimp 34 could be supplemented by an additional crimp or crimps, to better ensure that good electrical contact is made between the inner surface of the second sleeve 31 and the folded back portion of the shielding layer 17.

In order to attach the second sleeve 31 to the protector module 1, a first nut 36 is threaded onto the threaded portion 32 of the second sleeve 31. Then, the second sleeve 31 is inserted into the opening provided in the sidewall 3 of the protector module 1. Next, a second nut 37 is threaded onto the threaded portion 32 of the second sleeve 31. The first and second nuts 36, 37 capture the sidewall 3 of the protector module 1 to thereby physically attach the second sleeve 31 to the protector module 1.

The sidewall 3 is constructed of an electrically conductive material, such as sheet steel. Since the second sleeve 31 is constructed of an electrically conductive material, the physical connection between the second sleeve 31 and the sidewall 3 results in an electrical connection between the shielding layer 17 of the incoming multi-line phone cable 2 and the sidewall 3 of the protector module 1. If the opening in the sidewall 3 is overly large, washers may be included adjacent to the first and second nuts 36, 37 to enable the physical and electrical connection of the second sleeve 31 to the protector module 1.

Figure 7:
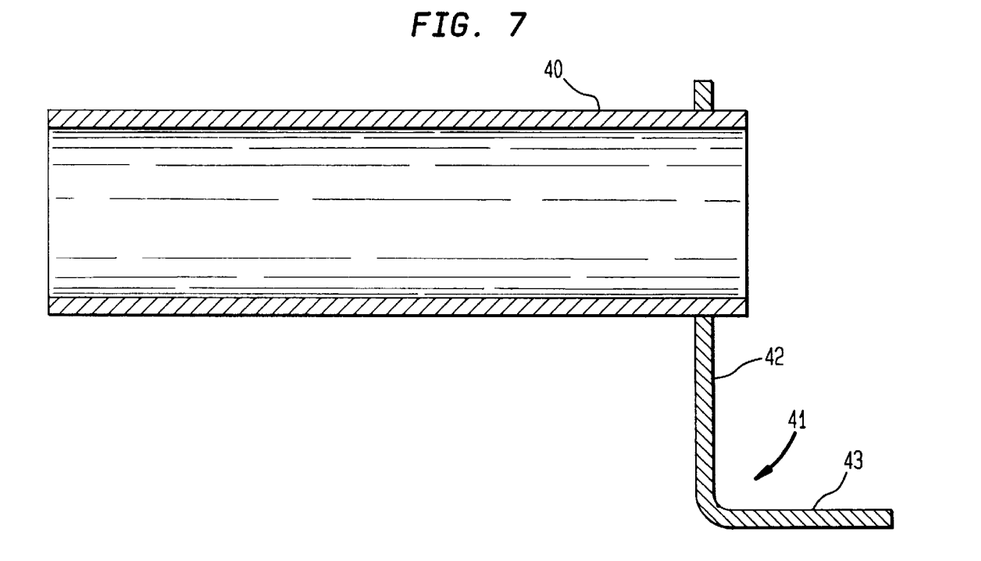
FIG. 7 is a cross sectional view of a second sleeve for attachment to the protector module, in accordance with the second embodiment of the present invention.

FIG. 7 illustrates a third sleeve 40 for use in the second embodiment of the electric coupling mechanism of the present invention. The third sleeve 40 is shaped as a cylinder having two open ends, and is formed of a conductive alloy or conductive metal such as aluminum, gold, or copper. A bracket 41 is attached to one end of the third sleeve 40. The bracket 41 includes a vertical portion 42 and a horizontal portion 43. The bracket 41 is connected to the third sleeve 40 by welding, soldering, a threaded engagement, or any other suitable form of fixing. The bracket 41 is also formed of an electrically conductive material.

Figure 8:
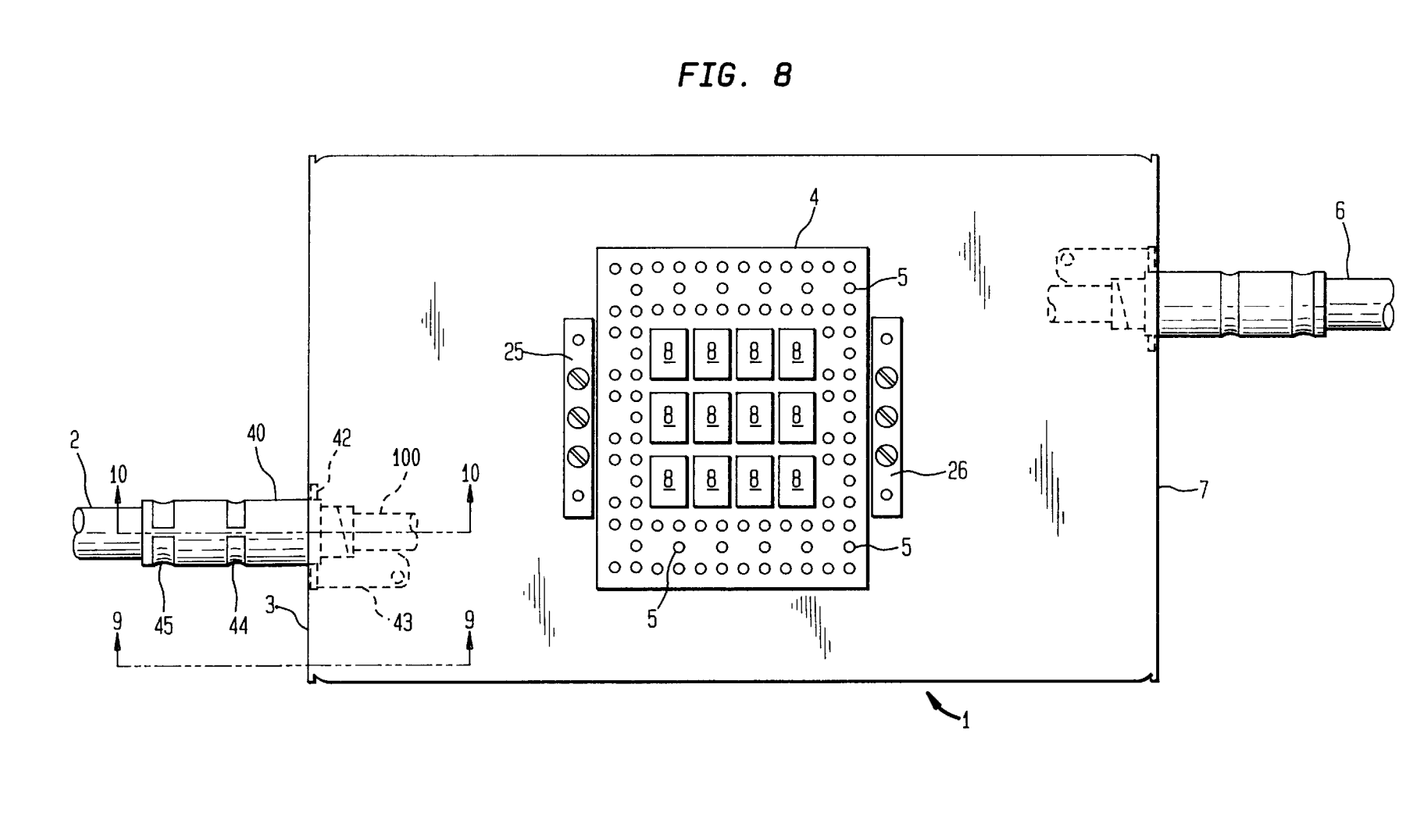
FIG. 8 is an overhead view of the protector module having an electrical connection between the shielding layer of the multi-line phone cable and the conductive chassis of the protector module, in accordance with the second embodiment of the present invention.
Figure 9:
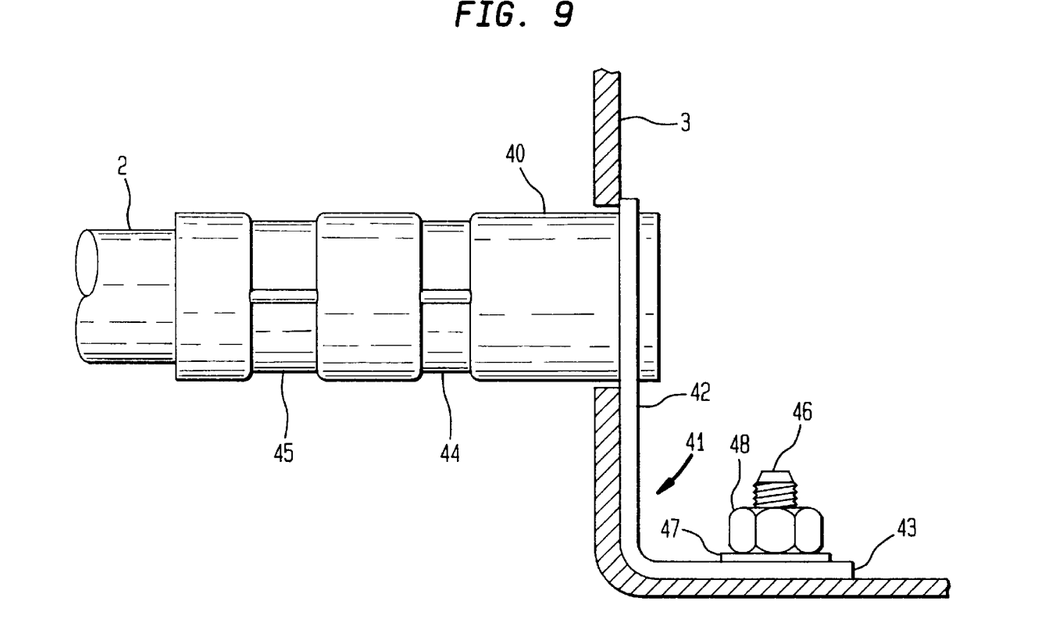
FIG. 9 is a cross sectional view taken along line 9—9 of FIG. 8.
Figure 10:
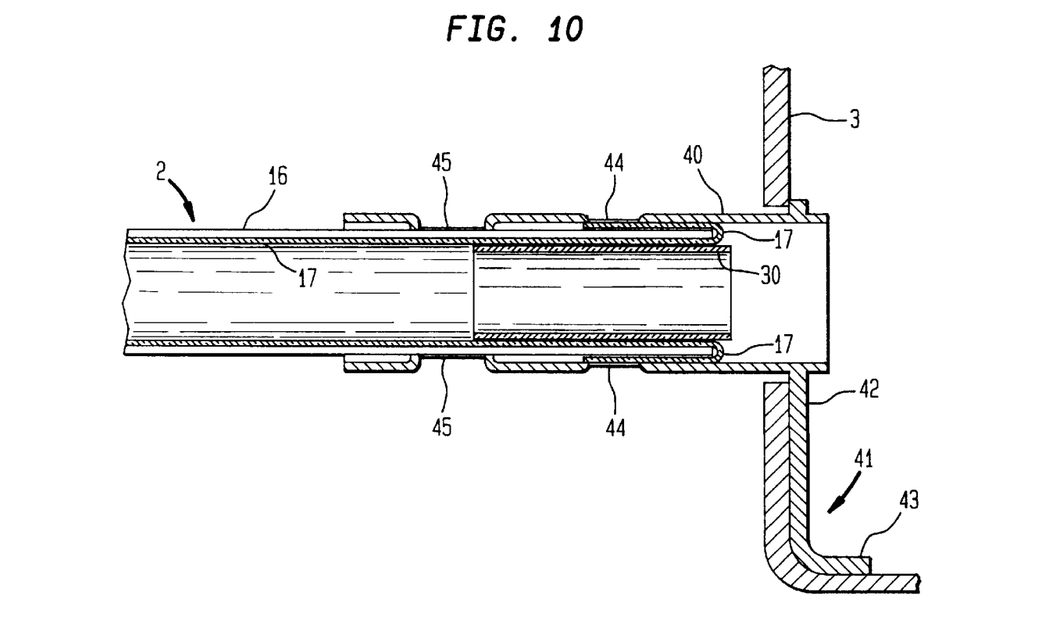
FIG. 10 is a cross sectional view taken along line 10—10 of FIG. 8.

Now, the construction of the second embodiment of the electric coupling mechanism will be described with reference to FIGS. 8, 9, and 10. As in the first embodiment, the insulation layer 16 is removed from the end of the incoming multi-line phone cable 2, thereby exposing the shielding layer 17. The exposed shielding layer 17 is folded back onto the adjacent, remaining portion of the insulation layer 16. The first sleeve 30 is inserted into the end of the incoming multi-line phone cable 2, so as to reside beneath the folded back portion of the shielding layer 17.

Next, the end of the incoming multi-line phone cable 2 is inserted into the third sleeve 40. A third crimp 44 is formed in the outer surface of the third sleeve 40. The third crimp 44 is located, so that it overlies the folded back portion of the shielding layer 17. The third crimp 44 causes an inner surface of the third sleeve 40 to contact the shielding layer 17, and to form good electrical contact therewith. Again, the rigidity of the first sleeve 30 provides protection to the plurality of phone lines of the incoming multi-line phone cable 2. Therefore, the third crimp 44 will not translate into breakage, deformation, or displacement of the phone lines of the incoming multi-line phone cable 2.

A fourth crimp 45 may also be formed in the outer surface of the third sleeve 40. The fourth crimp 45 would be located, so that it overlies the insulation layer 16 of the incoming multi-line phone cable 2. The fourth crimp 45 would provide strain relief to the electrical connection formed by the third crimp 44.

As in the first embodiment, the third and fourth crimps 44, 45 would be made by a special crimping tool, which encircles the third sleeve 40 and provides a uniform pressure to cause the third sleeve 40 to controllably collapse toward the incoming multi-line phone cable 2. As illustrated in the FIGS. 8 and 9, the third and fourth crimps 44, 45 are segmented crimps. Of course, the third and fourth crimps 44, 45 could be continuous crimps, as illustrated in FIG. 5, with regard to the first embodiment. Also, it is envisioned that the third crimp 44 could be supplemented by an additional crimp or crimps, to better ensure that good electrical contact is made between the inner surface of the third sleeve 40 and the folded back portion of the shielding layer 17.

In order to attach the third sleeve 40 to the protector module 1, a threaded stud 46 is provided on a bottom of the protector module 1. A through hole is provided in the horizontal portion 43 of the bracket 41. The threaded stud 46 is passed through the through hole of the horizontal portion 43, and the bracket 41 is secured to the protector module 1 by a washer 47 and nut 48.

The bottom of the protector module 1 is constructed of an electrically conductive material, such as sheet steel. Since the third sleeve 40 and bracket 41 are constructed of an electrically conductive material, the physical connection between the bracket 41 and the bottom of the protector module 1 results in an electrical connection between the shielding layer 17 of the incoming multi-line phone cable 2 and the protector module 1.

The outgoing multi-line phone cable 6 enters the sidewall 7 and is connected to the protector module 1, in a manner identical to the connection between the incoming multi-line phone cable 2 and the protector module 1. Because the chassis of the protector module 1 is formed of an electrically conductive material, such as sheet steel, the shielding layers of the incoming and outgoing multi-line phone cables are in electrical contact.

It can be seen from the present invention, that the ground strap 24 and two piece clamp assembly 18, of the background art, are no longer required. Further, it can be seen that the rigidity of the first sleeve 30 will protect the phone lines, within the incoming multi-line phone cable 2, from damage during the crimping of the second or third sleeves 31, 40. Therefore, the problems associated with the grounding assembly of the background art can be avoided.

Although the present invention has been illustrated in conjunction with grounding a shielding layer of a multi-line phone cable to a chassis of a protector module, it should be readily apparent that the invention would be suitable for different types of shielded electrical cables. For example, the connection device would be suitable for connecting a chassis to a shielding layer of a power line, speaker wires, 75 ohm video cable, computer cable, etc. Further, although a threaded stud 46 and nut 48 are illustrated as securing the bracket 41 to the protector module 1, it should be appreciated that other securing assemblies would be possible. For example, the bracket could be welded or riveted to the bottom or sidewall 3 of the protector module 1.

The invention being thus described, it will be obvious that the same may be varied in many ways. Such variations are not to be regarded as a departure is from the spirit and scope of the invention, and all such modifications as would be obvious to one skilled in the art are intended to be included within the scope of the following claims.

What is claimed is:

1. A connection device for grounding a shielded electrical cable to an electrical box comprising:
   a first sleeve for at least partially surrounding at least one electrical conductor of the shielded electrical cable adjacent to an end of the shielded electrical cable, the first sleeve to reside beneath a portion of a shielding layer of the shielded electrical cable; and
   a second sleeve, formed of a conductive material, for attachment to the electrical box, said second sleeve having a conductive inner surface for engaging the shielding layer of the shielded electrical cable and said second sleeve having a size sufficient to receive the end of the shielded electrical cable with said first sleeve.

2. The connection device according to claim 1, further comprising a first threaded nut and a second threaded nut, and wherein said second sleeve includes threading on an outer surface thereof, said first nut for engaging said threading and for residing inside the electrical box and said second nut for engaging said threading and for residing outside the electrical box.

3. The connection device according to claim 1, further comprising an electrically conductive bracket for attachment to the electrical box, and wherein said electrically conductive bracket is attached to, and in electrical communication with, said second sleeve for establishing the attachment between said second sleeve and the electrical box.

4. The connection device according to claim 1, wherein said first sleeve and said second sleeve are cylindrical in shape.

5. The connection device according to claim 1, wherein said first sleeve is for insertion at the end of the shielded electrical cable.

6. The connection device according to claim 1, wherein said first sleeve is for insertion at the end of the shielded electrical cable, to reside beneath a folded back portion of the shielding layer of the shielded electrical cable.

7. An interconnected electrical assembly comprising:
   a shielded electrical cable having an outer insulation layer, an inner conductive shielding layer and at least one electrical conductor surrounded by said inner conductive shielding layer, an end of said shielded electrical cable having said outer insulation layer removed to form an exposed portion of said inner conductive shielding layer;
   a first sleeve at least partially surrounding said at least one electrical conductor adjacent to said end of said shielded electrical cable and residing beneath said exposed portion of said inner conductive shielding layer;
   an electrical box; and
   a second sleeve, formed of a conductive material, said second sleeve being attached to, and in electrical communication with, said electrical box, said second sleeve having a conductive inner surface, said end of said shielded electrical cable being inserted into said second sleeve, and said conductive inner surface of said second sleeve engaging said exposed portion of said inner conductive shielding layer.

8. The interconnected electrical assembly according to claim 7, wherein said inner conductive shielding layer is folded back onto said outer insulation layer.

9. The interconnected electrical assembly according to claim 7, further comprising a first crimp formed in said second sleeve causing said conductive inner surface of said second sleeve to engage said inner conductive shielding layer to establish an electrical connection between said inner conductive surface of said second sleeve and said inner conductive shielding layer.

10. The interconnected electrical assembly according to claim 9, further comprising a second crimp formed in said second sleeve causing said conductive inner surface of said second sleeve to engage said outer insulation layer to establish strain relief to said electrical connection between said inner conductive surface of said second sleeve and said inner conductive shielding layer.

11. The interconnected electrical assembly according to claim 7, further comprising a first threaded nut and a second threaded nut, and wherein said second sleeve includes threading on an outer surface thereof, said first nut engaging said threading and residing inside said electrical box and said second nut engaging said threading and residing outside said electrical box.

12. The interconnected electrical assembly according to claim 7, further comprising a bracket, formed of an electrically conductive material, said bracket being attached to said electrical box, and wherein said bracket is also attached to, and in electrical communication with, said second sleeve for establishing an attachment, and electrical communication, between said second sleeve and said electrical box.

13. The interconnected electrical assembly according to claim 7, wherein said first sleeve and said second sleeve are cylindrical in shape.

14. The interconnected electrical assembly according to claim 7, wherein said shielded electrical cable is a shielded telephone cable.

15. The interconnected electrical assembly according to claim 14, wherein said electrical box is a protector module for diverting electrical surges in said shielded telephone cable to ground.

16. The interconnected electrical assembly according to claim 7, wherein said first sleeve is inserted at said end of said shielded electrical cable.

17. A method of connecting a shielding layer of an electrical cable to an electrical box comprising the steps of:
   providing an electrical cable having an outer insulation layer, an inner conductive shielding layer and at least one electrical conductor surrounded by said inner conductive shielding layer;
   removing the outer insulation layer near an end of the electrical cable, thereby forming an exposed portion of the inner conductive shielding layer near the end of the electrical cable;
   providing a first sleeve;
   locating the first sleeve at the end of the electrical cable, so that the first sleeve at least partially surrounds the at least one electrical conductor and resides beneath the exposed portion of the inner conductive shielding layer;
   providing an electrical box having a second sleeve, formed of an electrically conductive material, attached thereto;
   inserting the end of the electrical cable into the second sleeve; and manipulating the second sleeve so that a conductive inner surface of the second sleeve contacts the inner conductive shielding layer of the electrical cable, thereby forming an electrical connection between the inner conductive shielding layer of the electrical cable and the second sleeve.

18. The method according to claim 17, wherein said step of providing the electrical box having the second sleeve attached thereto includes the step of attaching the second sleeve to the electrical box by providing threads on an outer surface of the second sleeve and by fixing the second sleeve to the electrical box by a threaded engagement.

19. The method according to claim 18, wherein said fixing step of the second sleeve includes threading two nuts onto the second sleeve, one nut residing inside the electrical box and one nut residing outside the electrical box.

20. The method according to claim 18, wherein said manipulating step of the second sleeve takes place prior to said fixing step of the second sleeve.

21. The method according to claim 17, wherein said step of providing the electrical box having the second sleeve attached thereto includes the step of attaching the second sleeve to the electrical box by providing a bracket fixed to the second sleeve and by fixing the bracket to the electrical box.

22. The method according to claim 17, further comprising folding the exposed portion of the inner shielding layer near the end of the electrical cable back onto an unremoved portion of the outer insulation layer, prior to said manipulating step.

23. The method according to claim 17, wherein said step of locating includes inserting the first sleeve at the end of the shielded electrical cable.

24. The method according to claim 17, wherein said manipulating step includes crimping the second sleeve so that the conductive inner surface of the second sleeve contacts the inner conductive shielding layer of the electrical cable.

25. The method according to claim 24, further comprising crimping the second sleeve a second time so that the inner surface of the second sleeve contacts the outer insulation layer of the electrical cable to provide strain relief to the electrical connection between the inner shielding layer of the electrical cable and the second sleeve.

\* \* \* \* \*